(12) United States Patent
Jensen et al.

(10) Patent No.: US 7,392,783 B2
(45) Date of Patent: Jul. 1, 2008

(54) INTERNAL COMBUSTION ENGINE, ESPECIALLY IN A MOTOR VEHICLE, HAVING A FUEL FILTER SYSTEM

(75) Inventors: Hans Jensen, West Bloomfield, MI (US); Torsten Lika, Stuttgart (DE); Jürgen Stachl, Walled Lake, MI (US)

(73) Assignee: MAHLE International GmbH, Stuttgart (DE)

( * ) Notice: Subject to any disclaimer, the term of this patent is extended or adjusted under 35 U.S.C. 154(b) by 324 days.

(21) Appl. No.: 11/251,997

(22) Filed: Oct. 17, 2005

(65) Prior Publication Data

US 2007/0084432 A1 Apr. 19, 2007

(51) Int. Cl.
*F02M 17/30* (2006.01)
(52) U.S. Cl. .................................. 123/198 D; 210/235
(58) Field of Classification Search ............. 123/198 D, 123/196 S, 196 A, 198 DB, 529; 210/235, 210/234
See application file for complete search history.

(56) References Cited

U.S. PATENT DOCUMENTS 5,846,417 A 12/1998 Jiang et al.
5,855,780 A 1/1999 Dye et al.
6,148,849 A * 11/2000 Green et al. ................ 137/351
2003/0000882 A1 1/2003 Harvey et al.
2005/0072721 A1 4/2005 Knight

FOREIGN PATENT DOCUMENTS

DE 103 41 054 3/2004
DE 103 29 199 1/2005

OTHER PUBLICATIONS

International Search Report dated Jan. 24, 2007.

* cited by examiner

*Primary Examiner*—Stephen K. Cronin
*Assistant Examiner*—Hyder Ali
(74) *Attorney, Agent, or Firm*—Collard & Roe, P.C.

(57) ABSTRACT

An internal combustion engine, in a motor vehicle, has a fuel filter system in a fuel line leading to the internal combustion engine. The operation of this motor vehicle exclusively with fuel of filtered quality is ensured. To this end, a valve is provided inside the fuel line preventing the internal combustion engine from being started when the fuel is unfiltered.

6 Claims, 1 Drawing Sheet

Figure 1:
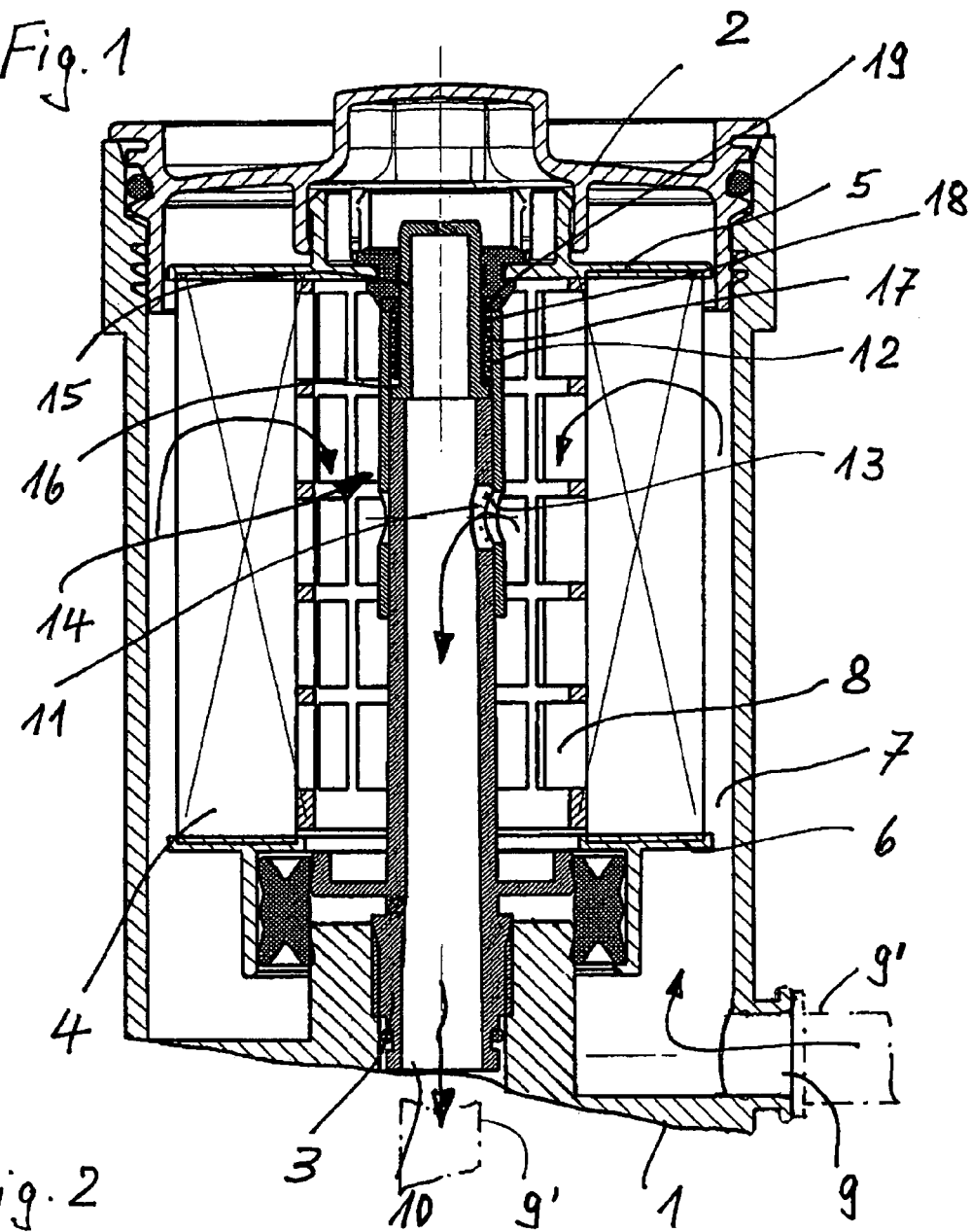

INTERNAL COMBUSTION ENGINE, ESPECIALLY IN A MOTOR VEHICLE, HAVING A FUEL FILTER SYSTEM

BACKGROUND OF THE INVENTION

The present invention relates to an internal combustion engine, in particular in a motor vehicle, having a fuel filter system according to the preamble of Patent claim 1.

DE 103 29 199 A1 and DE 103 41 054 A1 disclose internal combustion engines having oil lubricant filters which are provided with two replaceable filter elements, namely a mainstream filter and a side-stream filter in a divisible filter housing. In these filters, means are provided through which this oil lubricant filter can still ensure a reliably functioning engine operation even in the event of an inadvertent omission of the side-stream filter, and this is done by interrupting the side-stream pathway. With these known filter systems, engine operation is not necessarily prevented when the side-stream filter is not present, but instead engine operation is intentionally maintained. An internal combustion engine having such an oil lubricant system can be started without hindrance in particular and then operated further.

DISCLOSURE OF THE INVENTION

The present invention relates to the problem of ensuring, in the case of an internal combustion engine having a fuel filter system, that it will be possible to operate said internal combustion engine exclusively with fuel of a filtered quality.

This problem is solved with a generic internal combustion engine by an embodiment according to the characterizing feature of Patent claim 1.

Expedient and advantageous embodiments of the filter system in particular are the object of the dependent claims.

The present invention is based on the general idea of preventing a generic internal combustion engine from being operable without purified fuel. In particular, a filter system in the form of a fuel filter should not allow fuel to flow through it if there is no filter element in the interior of the filter housing. A condition in which no filter element is present in a fuel filter may occur, for example, when the used filter element is removed when servicing the filter but the filter housing is then inadvertently left empty without insertion of a replacement filter element or intentionally closed again because no replacement filter could be inserted. According to this invention, an interruption in fuel flow within the filter housing is achieved by providing a valve which has operating means that are operated by the filter element. This operation is compulsory and takes place in such a way that the valve is opened when no filter element is inserted and is closed when the filter element is present.

A preferred valve design consists of a pipe slide valve in which the position of the slide is determined by the position or absence of a filter element.

DESCRIPTION OF AN ILLUSTRATED EXEMPLARY EMBODIMENT

An exemplary embodiment which is explained in greater detail below is illustrated in schematic form in the drawing.

The drawing shows

Figure 2:
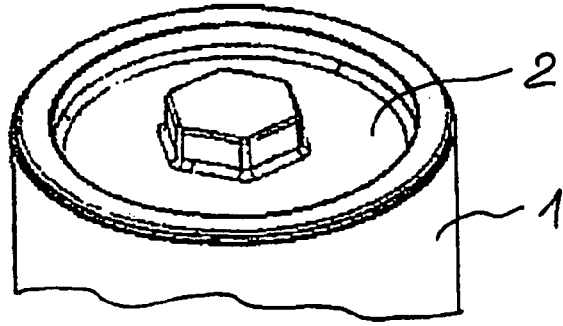

FIG. 1 a longitudinal section through a fuel filter having a replaceable ring filter element in a divisible filter housing shown cut away at one end, FIG. 2 a perspective view of the fuel filter from above with a diagram of the upper filter housing area showing only a detail.

In the case of a fuel filter having a divisible filter housing, namely a housing bottom 1 in a housing top part 2, a ring filter element 4 is replaceably supported on a stand pipe 3 protruding from the bottom to top in the housing bottom part 1 for replacement when the filter housing is opened. The divisible filter housing has on the whole a cylindrical shape, the two housing parts 1 and 2 being designed for this accordingly. The ring filter element 4 is mounted centrally in the interior of the filter housing.

The filter element 4 has ring-shaped end disks, namely an upper end disk 5 and a lower end disk 6 on its end faces. These end disks 5, 6 are sealed on the inside radially with respect to the stand pipe 3.

Through the filter element 4 the interior of the filter housing is divided by the filter element 4 into a crude space 7 and a clean space 8. An inlet channel 9 for the fuel which is to be fed into the filter and cleaned there for an internal combustion engine leads out of a fuel line 9' into the crude space 7. The fuel flows out through the stand pipe 3 which is designed to be hollow over most of its length starting from the bottom for this purpose. The lower end of the stand pipe 3 here forms a drain channel 10 leading outside of the filter. In order for filtered fuel to be able to flow out of the clean space 8 between the filter element 2 and the stand pipe 3 through the stand pipe, there is a radial opening 11 in the stand pipe 3 at a distance from the lower end of the housing bottom part 1. The fact that fuel can flow through the fuel filter is indicated with flow arrows in the drawing.

The radial opening 11 is part of a valve 14 having a pipe slide 12 mounted to be displaceable on the outside along the stand pipe 3. This pipe slide 12 is provided with a radial pipe slide opening 13. When the pipe slide valve 14 is opened, the radial opening 11 of the stand pipe 3 and the radial pipe slide opening 13 are aligned flush with one another and thus allow flow to pass through. When the pipe slide valve 14 is closed, a closed area of the pipe slide 12 blocks the radial opening 11 of the stand pipe 3. Opening and closing of the pipe slide valve 14 are accomplished by means of a longitudinal displacement of the pipe slide 12 on the stand pipe 3. The pipe slide valve 14 is operated by the filter element 4 via its upper end disk 5. It is operated in such a way that the pipe slide valve 14 is opened when a filter element 4 is inserted into the filter housing and is closed when no filter element 4 is present in the filter housing. This function is achieved through the following design.

The stand pipe 3 has a smaller diameter in an upper area 15 than in the lower area, thus forming a ring step 16 between the upper area 15 and the lower area. The pipe slide 12 is placed on the stand pipe 3 in such a way that its radial opening 13 is inside the lower area of the stand pipe and its upper area extends into the upper area 15. This forms a ring gap 17 between the upper area 15 of the stand pipe 3 and the upper area of the pipe slide 12. A cylindrical spiral spring 18 which is inserted into this ring gap 17 is supported on the ring step 16 as an end abutment. On the other end, the spiral spring 18 is supported on a ring collar 19 protruding into the ring gap 17 on the upper end face of the pipe slide 12.

When the filter element 4 is inserted, the upper end disk 5 is in direct contact with the upper end face, i.e., with the ring collar 19 of the pipe slide 12. Therefore, when a filter element 4 is inserted, it presses the pipe slide 12 downward into a position in which the radial openings 11 and 13 of the stand pipe 3 and/or the pipe slide 12 are aligned and thus allow fuel to flow through. In the absence of a filter element 4 inside the filter housing, the spiral spring 18 is relaxed and thereby shifts the pipe slide 12 into a position in which it closes the radial opening 11 in the stand pipe 3. According to this invention, the pipe slide valve 14 need only close the radial opening 13, i.e., prevent fuel flow through the filter, to such an extent that fuel flow through the filter is prevented, and therefore, the respective internal combustion engine is not functional. The operator of the internal combustion engine is therefore able to discern that something is not right with the fuel supply and therefore his attention will necessarily be drawn to the fact that there is no filter element 4 in the fuel filter.

A spring-loaded valve 14 is used in the exemplary embodiment described above. Due to the spring loading, this valve 14 closes when no filter element 4 is present, but it is kept open when the filter element 4 is inserted due to tension on the spring 18. Instead of a spring-loaded valve 14 operated in this way, such a valve may also be operated by closing it due to fuel flowing into the filter under operating pressure when no filter element 4 is present inside the fuel filter. In this case, a filter element 4 that is inserted closes an inlet opening into a pressure space in which fuel under operating pressure closes the valve 14 by applying tension to a spring 18. If the respective operating pressure does not prevail inside this pressure space because the incoming flow is blocked due to an inserted filter element 4, then the tension force that counteracts the spring 18 is omitted and the valve 14 is opened by spring force.

All the features described in the description and in the following claims may be essential to the present invention either alone or combined together in any desired form.

The invention claimed is:

1. A fuel filter system in the form of a fuel filter in a fuel line (9') leading to the internal combustion engine, having a replaceable filter element (4) in a divisible filter housing, comprising a valve (14) provided inside the fuel line (9') prevents the internal combustion engine from being started with unfiltered fuel;

the valve (14) is opened due to the position of the filter element (4) when a filter element (4) is present inside the filter housing, and when there is no filter element (4), the valve is closed due to the fuel pressure applied to the filter housing fuel inlet opening (9) under active filter operating pressure;

the divisible filter housing consists of a pot-shaped housing bottom part (1) having an opening opposite its bottom and a cover in the form of a housing top part (2) which can close this opening when in an operation-ready state;

a stand pipe (3), which is hollow on the inside, protrudes from the bottom to the aforementioned opening of the housing bottom part (1);

the stand pipe (3) directs fuel that has been filtered in the filter element (4) to the outside of the filter housing;

the stand pipe has a radial opening (11) in the clean room (8) of the filter;

a pipe slide (12) is displaceably mounted on the stand pipe (3) as part of a pipe slide valve (14);

the pipe slide (12) has a radial opening (13) which is aligned with the radial opening (11) of the stand pipe in a corresponding displacement position of the pipe slide (12) with respect to the stand pipe (3);

the pipe slide (12) assumes different positions with respect to the stand pipe (3), depending on whether or not there is a filter element (4) in the filter housing, namely a first position when a filter element (4) is inserted and a second position when there is no filter element; and in the first position it is possible for fuel to flow from the stand pipe (3) and the pipe slide (12) through the radial openings (11, 13) that are aligned and flush with one another, whereas this is impossible in the second position.

2. The fuel filter according to claim 1, comprising the filter element (4) is replaceable through the opening in the housing bottom part (1).

3. The fuel filter according to claim 2, comprising the pipe slide (12) is supported so that it is spring-loaded in its direction of movement;

when the filter element (4) is missing, the spring load causes the pipe slide (12) to be pushed into its second position; and when the filter element (4) is inserted, it shifts the pipe slide (12) into its first position by applying spring tension.

4. The fuel filter according to claim 3, wherein the pipe slide (12) is designed as a pipe slide surrounding the stand pipe (3).

5. The fuel filter according to claim 4, wherein the spring load results from a cylindrical spiral spring (18) which surrounds the stand pipe (3) and is supported axially at one end on the stand pipe and at the other end on the pipe slide (12).

6. An internal combustion engine for a motor vehicle with a fuel filter system according to claim 1.

* * * * *